(12) United States Patent
Contreras et al.

(10) Patent No.: US 8,045,297 B2
(45) Date of Patent: Oct. 25, 2011

(54) FLEX CABLE AND METHOD FOR LOWERING FLEX CABLE IMPEDANCE

(75) Inventors: John Contreras, Palo Alto, CA (US); Luiz M. Franca-Neto, Sunnyvale, CA (US); Jr-Yi Shen, Sunnyvale, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 515 days.

(21) Appl. No.: 12/323,329

(22) Filed: Nov. 25, 2008

(65) Prior Publication Data

US 2010/0128397 A1 May 27, 2010

(51) Int. Cl.
 *G11B 5/48* (2006.01)
 *H01B 7/08* (2006.01)

(52) U.S. Cl. ............ 360/245.9; 174/117 A; 174/117 F; 174/117 FF (58) Field of Classification Search ............... 360/245.9
See application file for complete search history.

(56) References Cited

U.S. PATENT DOCUMENTS

| | | | |
|---|---|---|---|
| 5,069,628 A * | 12/1991 | Crumly | 439/67 |
| 5,608,591 A * | 3/1997 | Klaassen | 360/245.9 |
| 5,796,552 A * | 8/1998 | Akin et al. | 360/264.2 |
| 6,278,583 B1 | 8/2001 | Adley | |
| 6,480,359 B1 * | 11/2002 | Dunn et al. | 360/245.9 |
| 6,493,190 B1 | 12/2002 | Coon | |
| 6,529,348 B2 | 3/2003 | Maruyama et al. | |
| 6,735,052 B2 * | 5/2004 | Dunn et al. | 360/245.9 |
| 6,934,126 B1 | 8/2005 | Berding et al. | |
| 6,975,488 B1 | 12/2005 | Kulangara et al. | |
| 7,026,545 B2 | 4/2006 | Barr et al. | |
| 7,035,027 B2 | 4/2006 | Barnett et al. | |
| 7,059,868 B1 | 6/2006 | Yan | |
| 7,319,573 B2 | 1/2008 | Nishiyama | |
| 7,399,929 B2 * | 7/2008 | Ueno et al. | 174/117 FF |
| 7,812,258 B2 * | 10/2010 | Price et al. | 174/110 R |
| 2004/0085667 A1 | 5/2004 | Chung et al. | |
| 2010/0078200 A1 * | 4/2010 | Shen | 174/254 |
| 2011/0102935 A1 * | 5/2011 | Nagaoka et al. | 360/75 |

FOREIGN PATENT DOCUMENTS

| | | | |
|---|---|---|---|
| JP | 06252519 A | * | 9/1994 |
| JP | 09185803 | | 7/1997 |
| JP | 2003326698 A | * | 11/2003 |
| WO | WO-96/42080 | | 12/1996 |

OTHER PUBLICATIONS

Hentges, et al., "Exploring Low Loss Suspension Interconnects for High Data Rates in Hard Disk Drives", *IEEE Transactions on Magnetics* vol. 44, No. 1, (Jan. 2008), 169-174.

Klaassen, et al., "Read/Write Electronics Front-end Systems for Hard Disk Drives", *IEEE Transactions on Magnetics*, vol. 40, No. 1, (Jan. 2004), 263-268.

Pro, et al., "Characteristic Impedance and Signal Loss Measurements of Head-to-Prearnplifier Interconnects", *IEEE Transactions on Magnetics*, vol. 42, No. 2, (Feb. 2006), 261-265.

Dodsworth, et al., "HGA Technology Driver-The Need for Speed With Control", *DataStorage*, (Sep. 2001),1-8.

* cited by examiner

*Primary Examiner* — Son Mai (57) ABSTRACT

A flex cable comprises a base film, a first adhesive layer coupled with the base film, and at least two signal traces coupled with the first adhesive layer. The flex cable comprises a second adhesive layer coupled with the signal traces and the first adhesive layer, and a cover film coupled with the second adhesive layer. The flex cable comprises an electrically conductive layer adjacent to the signal traces, and parallel with the base film and the cover film.

23 Claims, 5 Drawing Sheets

FLEX CABLE AND METHOD FOR LOWERING FLEX CABLE IMPEDANCE

TECHNICAL FIELD

This invention relates generally to the field of flex circuits and in particular to lowering the characteristic impedance of a signal trace in a flex cable for a hard disk drive.

BACKGROUND

Flex circuits are used to electrically couple components together such that relative motion between the components is made possible while maintaining electrical coupling. In a hard disk drive the flex circuit that couples the actuator with the base casting is known as a flex cable.

Expectations and demands continually increase for hard disk drives to store and manipulate larger quantities of data at faster speed. To meet these expectations and demands, the hard disk drive and its components are continually being improved. All electrical components, such as the flex cable are being scrutinized for their electrical characteristics and how their electrical performance can improve a hard disk drive's ability to store and manipulate larger quantities of data at faster speed.

SUMMARY OF THE INVENTION

Various embodiments of the present invention are described herein. A flex cable comprises a base film, a first adhesive layer coupled with the base film, and at least two signal traces coupled with the first adhesive layer. The flex cable comprises a second adhesive layer coupled with the signal traces and the first adhesive layer, and a cover film coupled with the second adhesive layer. The flex cable comprises an electrically conductive layer adjacent to the signal traces, and parallel with the base film and the cover film.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 (a-e) are cross-sections of a flex cable operable within an HDD in accordance with embodiments of the present invention.

FIG. 4 (a-f (1-5)) are cross-sections of a flex cable at process elements of fabrication in accordance with embodiments of the present invention.

The drawings referred to in this description should not be understood as being drawn to scale except if specifically noted.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

Computers have become part of every day life, and as such, expectations and demands continually increase for greater speed for manipulating data, for holding larger amounts of data, while being more compact and consuming less energy. To meet these demands for increased performance, the electromechanical assembly in a computer, specifically the Hard Disk Drive (HDD) has undergone many changes.

The efficiency of the components and subassemblies within an HDD can determine how efficient the HDD will store and manipulate data. The efficiency of the components and subassemblies within an HDD can also influence the power consumption of the HDD. Embodiments of the present invention enable higher data rate transfer while reducing the power consumption of an HDD.

A device within the HDD, known as an actuator, moves a magnetic transducer rapidly across a disk surface during operation. A flex cable enables data to be transferred between the actuator and a PC card while the actuator is moving the magnetic transducer across the disk surface. The conductors within the flex cable are commonly known as traces. The conductive path from the magnetic transducer to the signal amplifier and write driver for the magnetic transducer is typically known as the frontend system. Embodiments of the present invention address the flex cable portion of the frontend system. For the sake of brevity and clarity, embodiments of the present invention are directed towards lowering the characteristic impedance of the write frontend. Embodiments of the present invention can benefit the read frontend with a read architecture such as a common ease architecture.

The discussion will begin with a brief overview of a hard disk drive (HDD) which comprises a flex cable for communicatively coupling an actuator assembly to a printed circuit board, and characteristics of the flex cable which can influence the performance of the HDD. The discussion will then focus on embodiments of the present invention by which the characteristic impedance of the flex cable can be lowered and performance of the HDD can be improved. The implementation of embodiments of the present invention will then be discussed.

Overview

Figure 1:
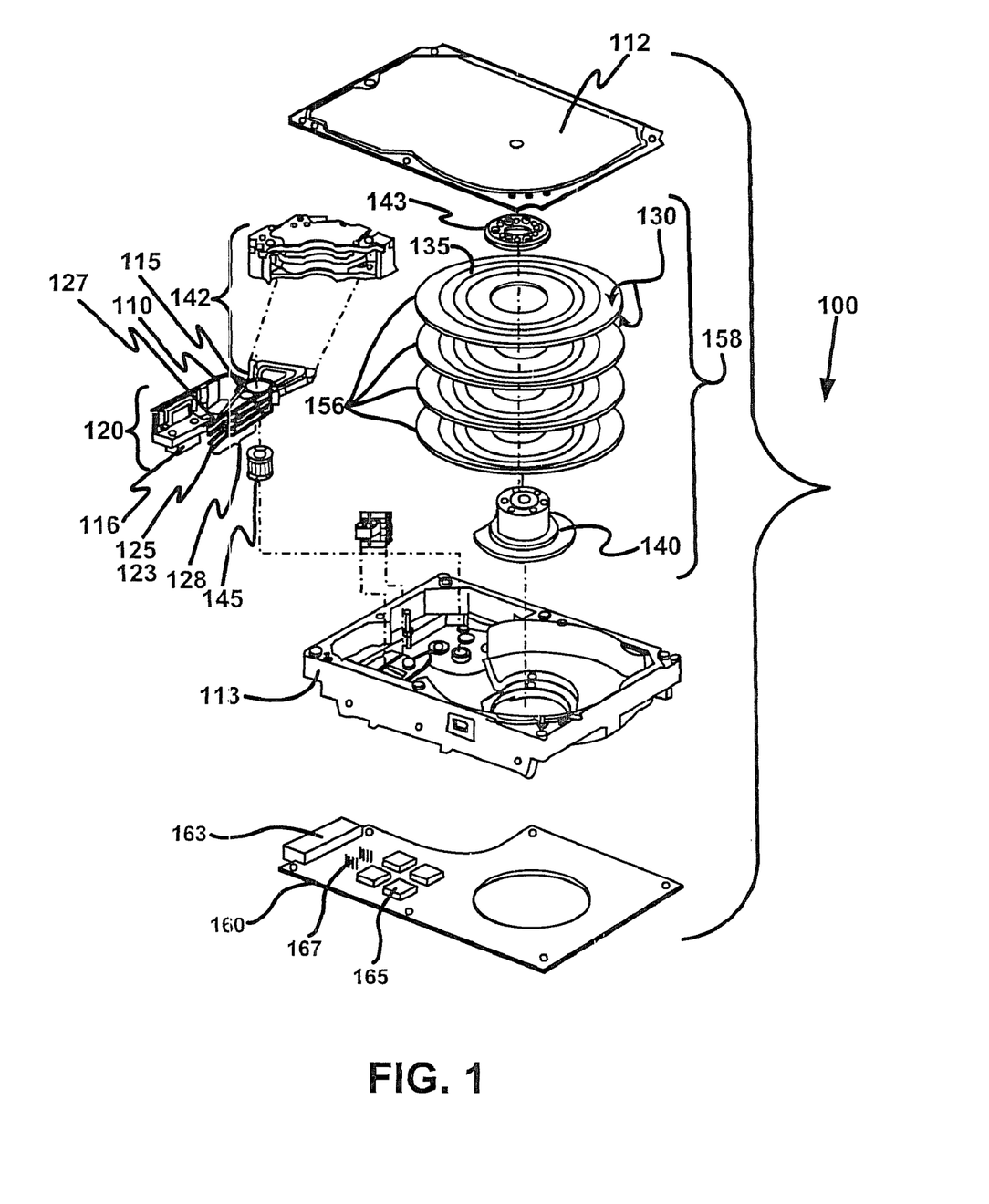
FIG. 1 is an isometric blow-apart of an HDD in accordance with one embodiment of the present invention.

With reference to FIG. 1, an isometric blow-apart of HDD 100 is presented in accordance with an embodiment of the present invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, at times referred to as an actuator assembly or carriage, comprises suspension 127, which suspends hard disk drive slider 125 next to disk surface 130, and HSA connector 116. Hard disk drive slider 125 is comprised of magnetic transducer 123 which reads and writes data to and from data tracks 135. Suspension 127 and hard disk drive slider 125 comprise head gimbal assembly (HGA) 128. Flex cable 110, which is part of HSA 120, conveys data between HSA connector 116 and arm electronics (A/E) module 115. HSA connector 116 also conveys control data between printed circuit board (PCB) 160 and VCM 142.

HSA 120, hereafter referred to as actuator assembly 120, is coupled pivotally with base casting 113 by means of pivot bearing 145, such that VCM 142 can move HGA 128 with slider 125 arcuately across disk surface 130, accessing data tracks 135. Upon assembly of actuator assembly 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as status check of HDD 100 before writing data, power control for motor-hub assembly 140, and servo control of VCM 142. VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160.

Figure 2:
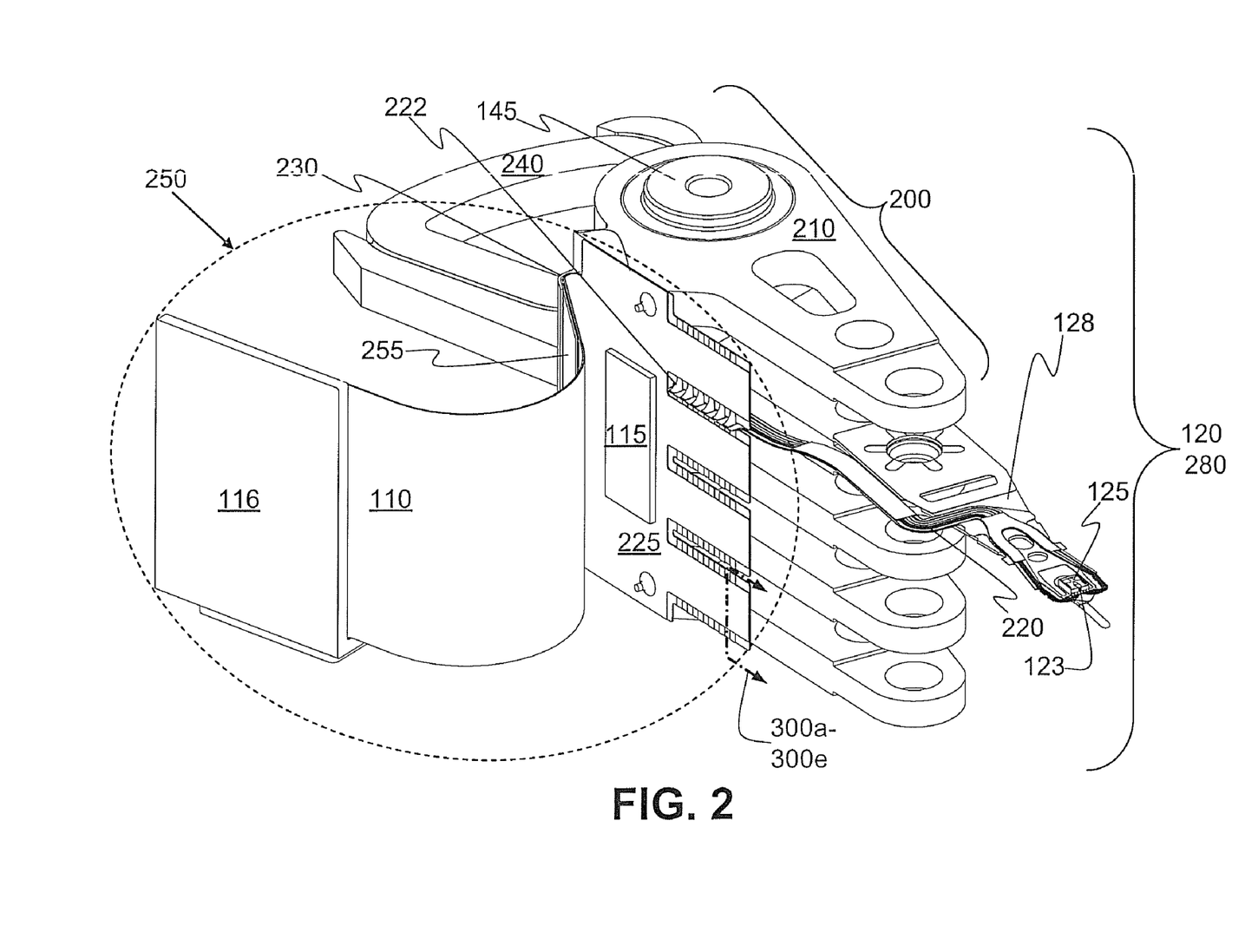
FIG. 2 is an isometric of an actuator assembly operable to an HDD in accordance with one embodiment of the present invention.

With reference to FIG. 2, the hierarchy of subassemblies and assemblies is defined as follow: Flex cable assembly 250 is a subassembly which is operable to being coupled with comb 210. In general, flex cable assembly 250 comprises flex cable 110 for conducting data signals from actuator assembly 120 to HSA connector 116. Flex cable 110 is a component to which other components can be added, such as A/E module 115, HSA connector 116, constrained layer damper (CLD) 255, and coupler 230, wherein assembled comprises flex cable assembly 250. Comb assembly 200 is a subassembly which is operable to receiving at least one HGA 128. In general, comb assembly 200 comprises, comb 210, voice coil 240, and flex cable assembly 250. Coupling at least one HGA 128 with comb assembly 200 comprises actuator assembly 120. Coupling pivot bearing 145 with actuator assembly 120 comprises actuator 280.

Components can be interchanged or shared between subassemblies while maintaining the spirit of the definitions of the aforementioned assemblies and subassemblies. Embodiments of the present invention, and as presented in FIG. 2, are applicable to the aforementioned assemblies and subassemblies as well as HDD 100 in which flex cable 110 is a component.

Flex cable 110 conveys data between HSA connector 116 and A/E module 115 while allowing actuator 280 to move magnetic transducer 123 arcuately across disk surface 130, accessing data tracks 135. HGA 128 comprises slider 125 and integrated lead suspension (ILS) traces 220. ILS traces 220 couple magnetic transducer 123 on slider 125 with termination 222. Termination 222 electrically couples magnetic transducer 123 with flex cable 110.

The section of flex cable 110 which comprises a portion of the frontend system will be from hereon referred to as frontend 225. Frontend 225 comprises signal traces which are operable for receiving and transmitting signals from magnetic transducer 123 between termination 222 and A/E module 115. Embodiments of the present invention lower the characteristic impedance of the frontend 225 by introducing an electrically conductive layer adjacent to the signal traces and thus enable the signal traces to be capacitively coupled with the electrically conductive layer and hence lower the impedance of the flex cable.

Well known and understood by one of ordinary skill in the art is the characteristic impedance equation $$Z_0 = \sqrt{\frac{L_{Flex}}{C_{Flex}}} \qquad (1)$$

for the flex segment in which $C_{Flex}$ is the distributed parallel capacitance through the flex, $L_{Flex}$ is the distributed series inductance, and $Z_0$ is the characteristic impedance of flex such as frontend 225.

Increased data rate, which is increase in the bandwidth for reading and writing, is a goal of HDD manufactures for storing data faster. Lower values of $Z_0$ improve the bandwidth by virtue of lowering the impedance at the driver and receiver, which inherently have an associated parasitic capacitance.

Data rates are now surpassing 2.5 Gbps, and low power write drivers are required to have low output impedance. Therefore, low flex impedance enables impedance matching between the flex and write driver's output impedance. Poor impedance matching will result in degradation in the write-signal's fidelity at the write magnetic transducer 123.

Well known and understood by one of ordinary skill in the art is a write driver circuit for driving the write element of magnetic transducer 123. The write driver circuit comprises a kick/echo circuit which controls the write current signal ($I_W$) to the write element of magnetic transducer 123. The voltage required by the kick/echo circuit is known as the initial launch voltage and can be appreciated as being determined by the equation $$V_{LV} = \frac{I_W Z_0 (R_S + R_H)}{(R_S + Z_0)}. \qquad (2)$$

The initial launch voltage $V_{LV}$ is a function of the write driver signal current $I_W$, conducted through a data transmission circuit such as frontend 225, the characteristic impedance $Z_0$ and output impedance of the write driver, $R_S$, connecting to the data transmission conductors such as frontend 225, through the ILS 220, and the write element resistance $R_H$ of magnetic transducer 123. Upon inspection of equation (2) it can be appreciated that $V_{LV}$ increases proportionally with an increase in $Z_0$. A relatively large value of $Z_0$ requires a larger power supply voltage which increases heat and cost of operation for the HDD.

Physical Description

With continued reference to FIG. 2, actuator assembly 120, which is operable within HDD 100, is presented in accordance with an embodiment of the present invention. Comb assembly 200, when coupled with actuator assembly 120 and pivot bearing 145, is operable to arcuately moving magnetic transducer 123 across data tracks 135 in HDD 100. Comb assembly 200 comprises a flex cable assembly 250, wherein flex cable assembly 250 has flex cable 110 for conducting data signals from actuator assembly 120 to HSA connector 116, and CLD 255. Flex cable 110 comprises frontend 225, which has a signal trace operable for receiving and transmitting signals from magnetic transducer 123 between termination 222 and A/E module 115.

With reference to FIG. 3A, FIG. 3B, FIG. 3C, FIG. 3D, and FIG. 3E, cross-sections 300a, 300b, 300c, 300d, and 300e of a flex cable for an actuator are presented respectively in accordance with embodiments of the present invention. Cross-sections 300a through 300e are taken through frontend 225 presented in FIG. 2, which is an isometric of actuator assembly 120, actuator 280, flex cable assembly 250, and flex cable 110, which are operable within HDD 100 and in accordance with embodiments of the present invention.

In accordance with an embodiment of the present invention flex cable 110 comprises base film 330 for receiving additional layers and films. Adhesively coupled to base film 330 is first adhesive layer 335. At least two signal traces 310 are adhesively coupled to first adhesive layer 335 and thus coupled with base film 330. Second adhesive layer 345 is adhesively coupled to signal traces 310 and first adhesive layer 335. Cover film 340 is adhesively coupled to second adhesive layer 345. Electrically conductive layer 320 is coupled adjacent to signal traces 310 and parallel with base film 330 and cover film 340.

In accordance with an embodiment of the present invention, electrically conductive layer 320 has a thickness 312 of approximately 3 microns or greater. Electrically conductive layer 320 is selected from the group of metals and metal alloys consisting of copper, aluminum, silver, and gold.

Figure 3:
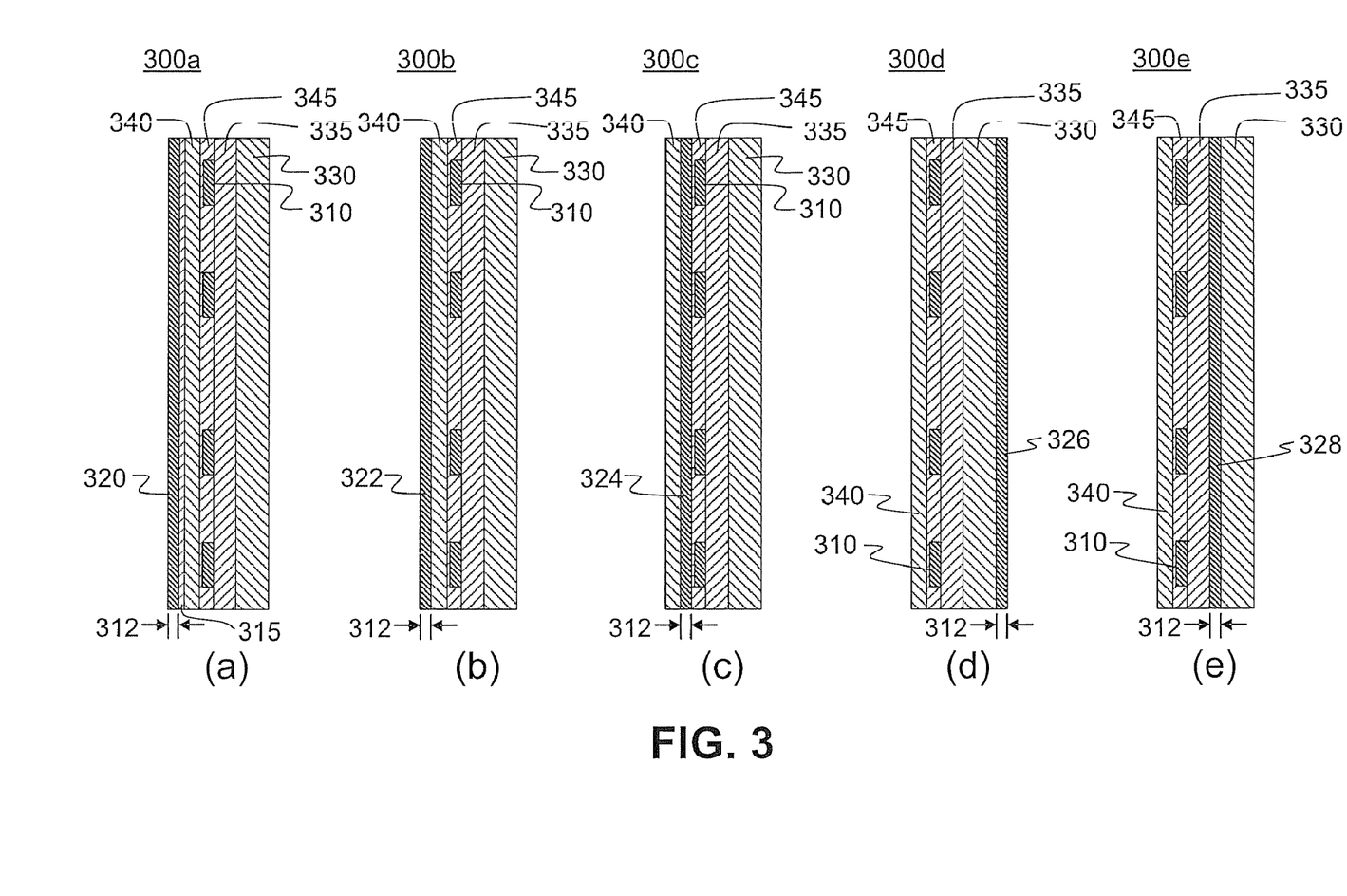

With respect to FIG. 3A, cross-section 300a of flex cable 110, which is operable to HDD 100, is presented in accordance with an embodiment of the present invention. Electrically conductive layer 320 is adhesively coupled with cover film 340 with adhesive 315. With respect to FIG. 3B, cross-section 300b of flex cable 110 operable to HDD 100 is presented in accordance with another embodiment of the present invention. Electrically conductive layer 322 is deposited onto the outermost surface of cover film 340 with any one of deposition processes well known and understood by one of ordinary skill in the art. Examples of such depositions processes are: RF sputtering, evaporation, and chemical vapor deposition, all of which can be augmented with an electroplating process to obtain thickness 312 of approximately 3 microns or greater.

With respect to FIG. 3C, cross-section 300c of flex cable 110 operable to HDD 100 is presented in accordance with another embodiment of the present invention. Electrically conductive layer 324 is deposited onto cover film 340 with any one of deposition processes well known and understood by one of ordinary skill in the art, and coupled with second adhesive layer 345 to signal traces 310. Examples of depositions processes for electrically conductive layer 324 are: RF sputtering, evaporation, and chemical vapor deposition, all of which can be augmented with an electroplating process to obtain thickness 312 of approximately 3 microns or greater.

With respect to FIG. 3D, cross-section 300d of flex cable 110, which is operable to HDD 100, is presented in accordance with another embodiment of the present invention. Electrically conductive layer 326 is deposited onto the outermost surface base film 330 with any one of deposition processes well known and understood by one of ordinary skill in the art. Examples of such depositions processes are: RF sputtering, evaporation, and chemical vapor deposition, all of which can be augmented with an electroplating process to obtain thickness 312 of approximately 3 microns or greater.

With respect to FIG. 3E, cross-section 300e of flex cable 110 operable to HDD 100 is presented in accordance with another embodiment of the present invention. Electrically conductive layer 328 is deposited onto base film 330 with any one of deposition processes well known and understood by one of ordinary skill in the art, and coupled with first adhesive layer 335 to signal traces 310. Examples of depositions processes for electrically conductive layer 328 are: RF sputtering, evaporation, and chemical vapor deposition, all of which can be augmented with an electroplating process to obtain thickness 312 of approximately 3 microns or greater.

In accordance with an embodiment of the present invention, base film 330 and cover film 340 are chosen from a group of plastics known for their compatibility with the environment of HDD 100, for their manufacturability, and for their specific stiffness and flexibility. Examples of plastics in this group are: polyimide and polyester, commonly available from DuPont Corporation as KAPTON and MYLAR; and UPILEX, commonly available from Ube Industries. Signal traces 310 comprise copper or an alloy of copper such as Cu—Ni—Si—Mg, Be—Cu—Ni, and Cu—Ti. In accordance with another embodiment of the present invention, signal traces 310 comprise a non-copper conductor such as aluminum, carbon, silver ink, INCONEL, and constantan.

Operation

FIG. 4A through FIG. 4F (1 through 5) are cross-sections of a flex cable at process elements of fabrication in accordance with embodiments of the present invention. Cross-sections of the flex cable presented in FIG. 4F1 through FIG. 4F5 are similar to cross-sections 300a through 300e of flex cable 110 presented respectively in FIG. 3A through FIG. 3E.

Figure 5:
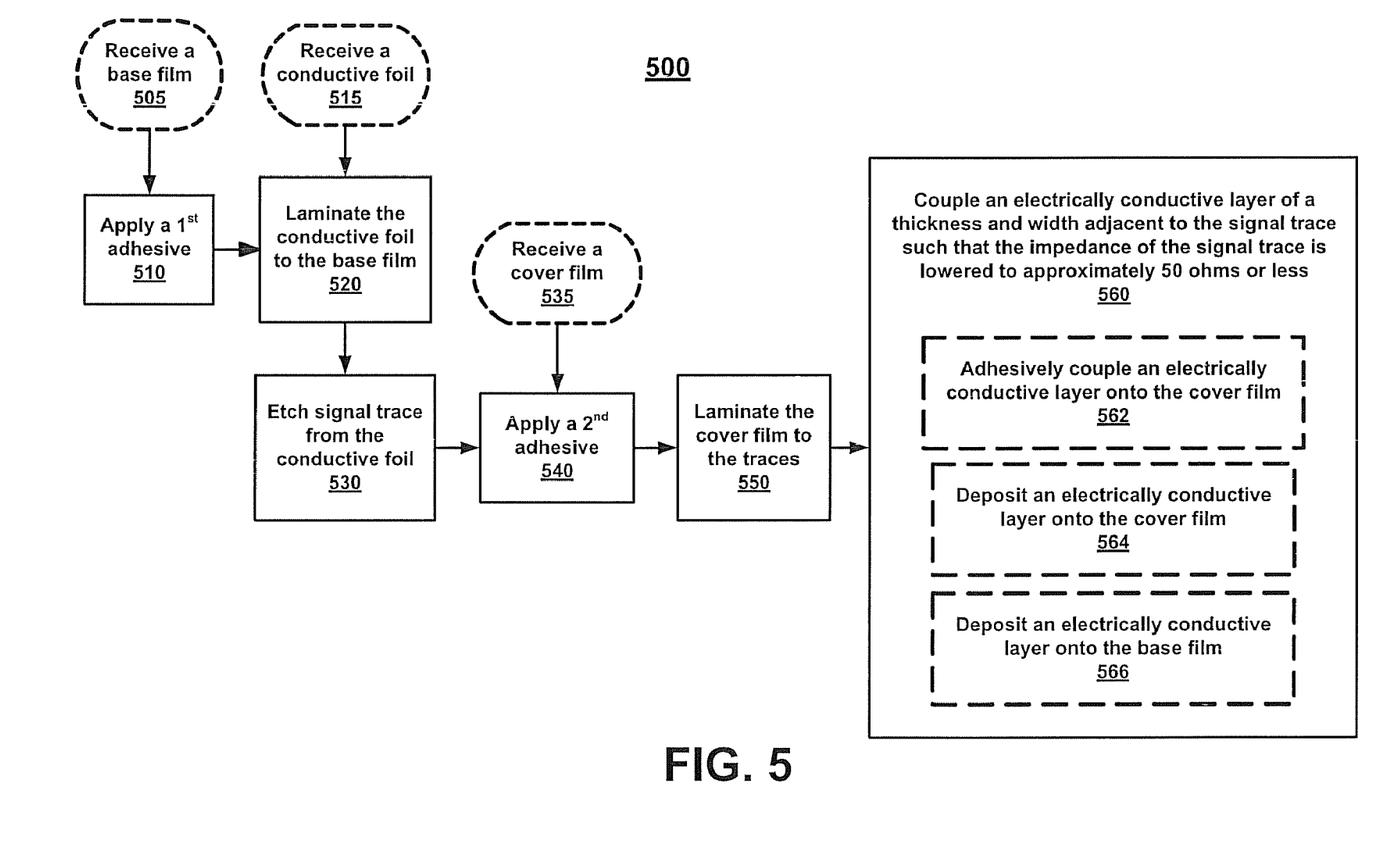
FIG. 5 is a flow chart illustrating a process for lowering impedance of a flex cable in accordance with one embodiment of the present invention.

FIG. 5 is a flow chart illustrating a process 500 for lowering impedance of a flex cable in accordance with one embodiment of the present invention. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 500, such components are examples of components for carrying out process 500. That is, the embodiments of the present invention are well suited to performing various other components or variations of the components recited in FIG. 5. Within the present embodiment, it should be appreciated that the components of process 500 may be performed by software, by hardware, by an assembly mechanism, through human interaction, or by any combination of software, hardware, assembly mechanism, and human interaction.

Process 500 will be described with reference to elements shown in FIG. 4A through FIG. 4F (1 through 5).

In one embodiment, as shown at element 505 of process 500, base film 330 is received into process 500. Base film 330 is chosen from a group of plastics known for their compatibility with the environment of HDD 100, for their manufacturability, and for their specific stiffness and flexibility. Examples of plastics in this group are: polyimide and poly (ester, commonly available from DuPont Corporation as KAPTON and MYLAR; and UPILEX, commonly available from Ube Industries.

In one embodiment, as shown at element 510 of process 500 and FIG. 4A, first adhesive layer 335 is applied to base film 330. Adhesives that are typically used in flex cables are epoxy, pressure sensitive adhesive (PSA), and acrylic. Each adhesive has its own method of application which is well known and understood by one of ordinary skill in the art.

In one embodiment, as shown at element 515 of process 500, conductive foil 405 is received into process 500. In one embodiment conductive foil 405 comprises copper or an alloy of copper such as Cu—Ni—Si—Mg, Be—Cu—Ni, and Cu—Ti. In another embodiment conductive foil 405 comprises a non-copper conductor such as aluminum, carbon, silver ink, INCONEL, and constantan.

In one embodiment, as shown at element 520 of process 500 and FIG. 4B, conductive foil 405 is laminated to base film 330 with first adhesive layer 335. The lamination process is dependent upon the adhesive used in first adhesive layer 335. Lamination processes are well known and understood by one of ordinary skill in the art. The lamination processes of element 520 comprise any one of the following: pressing conductive foil 405 onto a wet film of epoxy applied on base film 330 and curing the epoxy; joining with pressure and elevated temperature conductive foil 405 to a dry film of PSA that has been placed onto base film 330 and reflowing the PSA; joining with pressure and elevated temperature conductive foil 405 to a dry film of acrylic that has been placed onto base film 330 and reflowing the acrylic.

In one embodiment, as shown at element 530 of process 500 and FIG. 4C, at least two signal traces 310 are etched from conductive foil 405. Etching of signal traces 310 from conductive foil 405 is well known and understood by one of ordinary skill in the art. Briefly, etching signal traces 310 from conductive foil 405 comprises, applying a photosensitive polymer precursor, such as photoresist to conductive foil 405. The photosensitive polymer precursor is irradiated with ultraviolet light through a photo-mask which has the image of a pattern, such as signal traces 310. The irradiated photosensitive polymer precursor is polymerized by the ultraviolet light in desired location according to the image of the pattern on the photo-mask. The non-polymerized photosensitive polymer precursor is removed with an appropriate solvent. The pattern formed in the polymerized photosensitive polymer on conductive foil 405 is etched with an appropriate acid into conductive foil 405.

In one embodiment, as shown at element 535 of process 500, cover film 340 is received into process 500. Cover film 340 is chosen from a group of plastics known for their compatibility with the environment of HDD 100, for their manufacturability, and for their specific stiffness and flexibility. Examples of plastics in this group are: polyimide and polyester, commonly available from DuPont Corporation as KAPTON and MYLAR; and UPILEX, commonly available from Ube Industries.

In one embodiment, as shown at element 540 of process 500 and FIG. 4D, second adhesive, layer 345 is applied to cover film 340. Adhesives that are typically used in flex cables are epoxy, pressure sensitive adhesive (PSA), and acrylic. Each adhesive has its own method of application which is well known and understood by one of ordinary skill in the art.

In one embodiment, as shown at element 550 of process 500 and FIG. 4E, cover film 340 is laminated to signal trace 310 with second adhesive layer 345. The lamination processes of element 550 comprise any one of the following: pressing signal traces 310 and first adhesive layer 335 onto a wet film of epoxy applied on cover film 340 and curing the epoxy; joining with pressure and elevated temperature signal traces 310 and first adhesive layer 335 to a dry film of PSA that has been placed onto cover film 340 and reflowing the PSA; joining with pressure and elevated temperature signal traces 310 and first adhesive layer 335 to a dry film of acrylic that has been placed onto cover film 340 and reflowing the acrylic.

In one embodiment, as shown at element 560 of process 500 and FIG. 4F (1 through 5), electrically conductive layer (320, 322, 324, 326, 328) is coupled adjacent to signal traces (310, 412, 414) and parallel with base film 330 and cover film 330. Electrically conductive layer (320, 322, 324, 326, 328) is selected from the group of metals and metal alloys consisting of copper, aluminum, silver, and gold. Electrically conductive layer (320, 322, 324, 326, 328) has a thickness 312 of approximately 3 microns or greater thereby enabling sufficient conductivity of electrically conductive layer (320, 322, 324, 326, 328) to have capacitive coupling with signal traces (310, 412, 414) and electrically conductive layer (320, 322, 324, 326, 328).

In one embodiment, as shown at element 562 of process 500 and FIG. 4F1, electrically conductive layer 320 is adhesively coupled with cover film 340 with adhesive 315. Electrically conductive layer 320 is received into process 500 with adhesive 315 applied to electrically conductive layer 320 and a protective film covering the surface of adhesive 315 to be coupled with cover film 340. The protective film is absent from FIG. 4F1 since it is removed upon coupling electrically conductive layer 320 with cover film 340.

In one embodiment, as shown at element 564 of process 500 and FIG. 4F2, electrically conductive layer 322 is deposited onto cover film 340. Electrically conductive layer 322 is deposited with a thickness 312 of approximately 3 microns or greater and a width (402, 404) such that impedance of signal traces (412, 414) is lowered to approximately 50 ohms or less. Electrically conductive layer 322 is deposited onto the outermost surface of cover film 340 with any one of deposition processes well known and understood by one of ordinary skill in the art. Examples of such depositions processes are: RF sputtering, evaporation, and chemical vapor deposition, all of which can be augmented with an electroplating process to obtain thickness 312 of approximately 3 microns or greater.

Embodiments of the present invention can benefit the read frontend with a read architecture such as a common base architecture. With continued reference to FIG. 4F2, signal traces such as signal traces 414 which are operable to conducting a read signal have a different width than signal traces such as signal traces 412 which are operable to conducting a write signal. In accordance with an embodiment of the present invention, electrically conductive layer 322 has a width (402, 404) which corresponds with widths of signal traces (412, 414) such that impedance of signal traces (412, 414) is lowered to approximately 50 ohms or less.

In one embodiment, as shown in FIG. 4F3, electrically conductive layer 324 is deposited onto cover film 340 and coupled with signal traces 310 with second adhesive layer 345. Electrically conductive layer 324 is deposited with a thickness 312 of approximately 3 microns or greater and a width such that impedance of signal traces 310 is lowered to approximately 50 ohms or less. Electrically conductive layer 324 is deposited onto the innermost surface of cover film 340 closest to signal traces 310 with any one of deposition processes well known and understood by one of ordinary skill in the art. Examples of such depositions processes are: RF sputtering, evaporation, and chemical vapor deposition, all of which can be augmented with an electroplating process to obtain thickness 312 of approximately 3 microns or greater.

Figure 4:
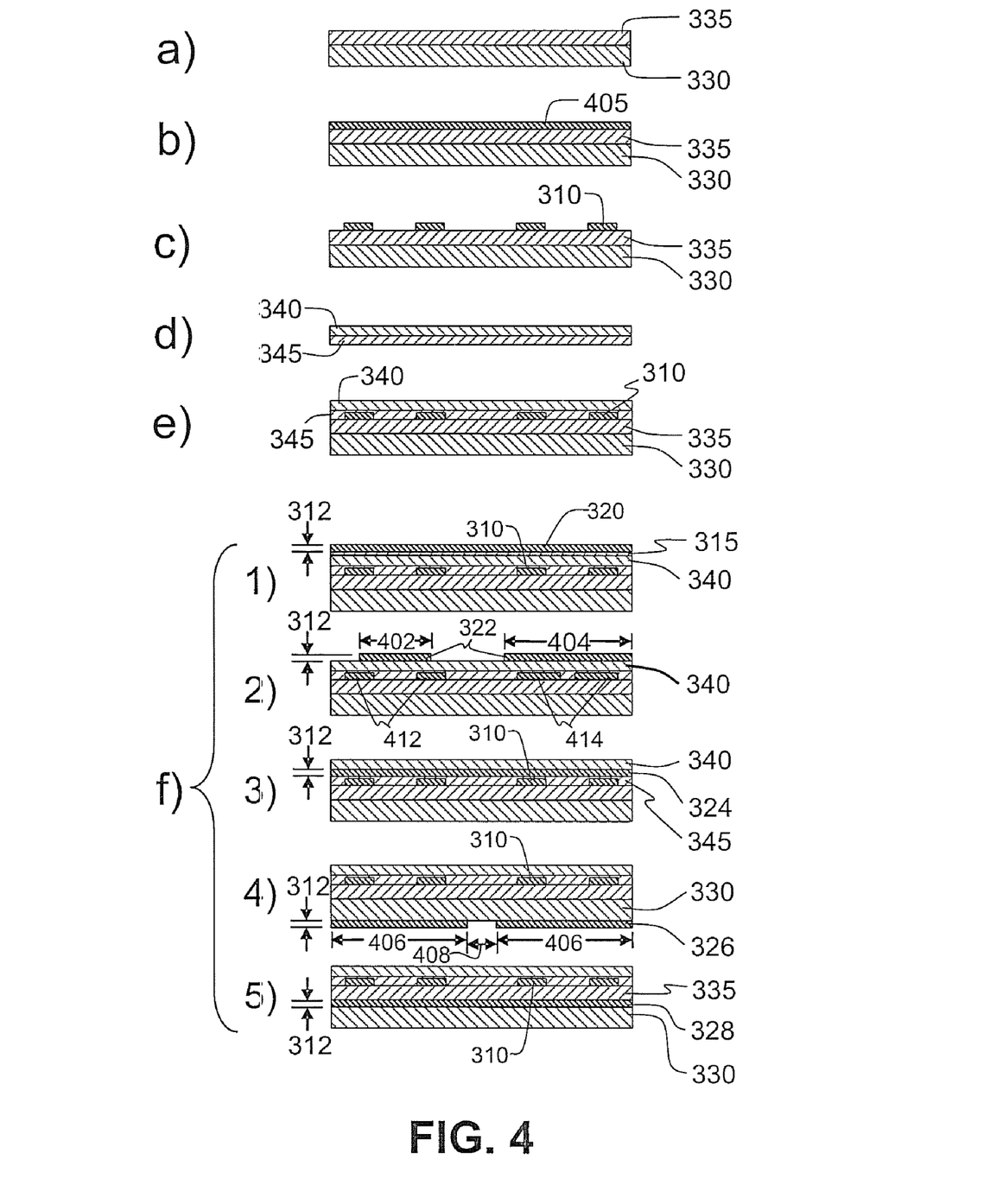

In one embodiment, as shown at element 566 of process 500 and FIG. 4F4, electrically conductive layer 326 is deposited onto base film 330. Electrically conductive layer 326 is deposited with a thickness 312 of approximately 3 microns or greater and a width 406 such that impedance of signal traces 310 is lowered to approximately 50 ohms or less. Electrically conductive layer 326 is deposited onto the outermost surface of base film 330 with any one of deposition processes well known and understood by one of ordinary skill in the art. Examples of such depositions processes are: RF sputtering, evaporation, and chemical vapor deposition, all of which can be augmented with an electroplating process to obtain thickness 312 of approximately 3 microns or greater. In accordance with an embodiment of the present invention electrically conductive layer 326 is discontinuous with gap 408 and width 406 such that impedance of signal traces 310 is lowered to approximately 50 ohms or less.

In one embodiment, as shown in FIG. 4F5, electrically conductive layer 328 is deposited onto base film 330 and coupled with signal traces 310 with first adhesive layer 335. Electrically conductive layer 328 is deposited with a thickness 312 of approximately 3 microns or greater and a width such that impedance of signal traces 310 is lowered to approximately 50 ohms or less. Electrically conductive layer 328 is deposited onto the innermost surface of base film 330 closest to signal traces 310 with any one of deposition processes well known and understood by one of ordinary skill in the art. Examples of such depositions processes are: RF sputtering, evaporation, and chemical vapor deposition, all of which can be augmented with an electroplating process to obtain thickness 312 of approximately 3 microns or greater.

The present invention, in the various presented embodiments increases data rate of an HDD by lowering the impedance of a flex cable. Embodiments of the present invention lower the impedance of a flex cable by introducing an electrically conductive layer adjacent to signal traces in the flex cable and thus enable the signal traces to be capacitively coupled with the electrically conductive layer and hence lower the impedance of the flex cable. Lowering the flex cable impedance also decreases the launch voltage required by the write driver, thereby enabling an HDD to be designed and built with a smaller power supply. A smaller power supplies allows the HDD to consume less power and generate less heat.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A flex cable comprising:
a base film;
a first adhesive layer coupled with said base film;
at least two signal traces coupled with said first adhesive layer;
a second adhesive layer coupled with said signal traces and said first adhesive layer;
a cover film coupled with said second adhesive layer; and
an electrically conductive layer adjacent to said signal traces, and parallel with said base film and said cover film.

2. The flex cable of claim 1 wherein said electrically conductive layer is approximately 3 microns or greater in thickness.

3. The flex cable of claim 1 wherein said electrically conductive layer is selected from the group of metals and metal alloys consisting of: copper, aluminum, silver, and gold.

4. The flex cable of claim 1 wherein said electrically conductive layer is coupled with said base film.

5. The flex cable of claim 1 wherein said electrically conductive layer is coupled with said first adhesive.

6. The flex cable of claim 1 wherein said electrically conductive layer is coupled with said second adhesive.

7. The flex cable of claim 1 wherein said electrically conductive layer is coupled with said cover film.

8. The flex cable of claim 1 wherein said base film and said cover film are selected from the group of polymers consisting of: polyimide, UPILEX, KAPTON, polyester, and MYLAR.

9. The flex cable of claim 1 wherein said signal trace comprises copper.

10. A hard disk drive comprising:
a flex cable communicatively coupling an actuator assembly to a printed circuit board, said flex cable having:
a base film;
a first adhesive layer coupled with said base film;
at least two signal traces coupled with said first adhesive layer;
a second adhesive layer coupled with said signal traces and said first adhesive layer;
a cover film coupled with said second adhesive layer; and
an electrically conductive layer adjacent to said signal traces, and parallel with said base film and said cover film.

11. The hard disk drive of claim 10 wherein said electrically conductive layer is approximately 3 microns or greater in thickness.

12. The hard disk drive of claim 10 wherein said electrically conductive layer is selected from the group of metals and metal alloys consisting of: copper, aluminum, silver, and gold.

13. The hard disk drive of claim 10 wherein said electrically conductive layer is coupled with said base film.

14. The hard disk drive of claim 10 wherein said electrically conductive layer is coupled with said first adhesive.

15. The hard disk drive of claim 10 wherein said electrically conductive layer is coupled with said second adhesive.

16. The hard disk drive of claim 10 wherein said electrically conductive layer is coupled with said cover film.

17. The hard disk drive of claim 10 wherein said base film and said cover film are selected from the group of polymers consisting of: polyimide, UPILEX, KAPTON, polyester, and MYLAR.

18. The hard disk drive of claim 10 wherein said signal trace comprises copper.

19. A method of lowering the impedance of a flex cable, said method comprising:
applying a first adhesive to a base film;
laminating a conductive foil to said base film with said first adhesive;
etching from said conductive foil at least two signal traces;
applying a second adhesive to a cover film;
laminating said cover layer with said second adhesive layer to said signal traces and said first adhesive layer; and
coupling an electrically conductive layer adjacent to said signal traces, and parallel with said base film and said cover film, thereby capacitively coupling said signal traces with said electrically conductive layer hence lowering the impedance of said flex cable.

20. The method as recited in claim 19 wherein said coupling said electrically conductive layer comprises:
depositing an electrically conductive layer onto said base film.

21. The method as recited in claim 19 wherein said coupling said electrically conductive layer comprises:
depositing an electrically conductive layer onto said cover film.

22. The method as recited in claim 19 wherein said coupling said electrically conductive layer comprises:
   adhesively coupling an electrically conductive layer with said cover film.

23. The method as recited in claim 19 wherein said coupling said electrically conductive layer comprises:
   coupling an electrically conductive layer of a thickness and width such that impedance of said signal traces is lowered to approximately 50 ohms or less.

* * * * *